(12) United States Patent
Lieberman et al.

(10) Patent No.: US 6,802,188 B1
(45) Date of Patent: Oct. 12, 2004

(54) METHOD OF MAKING PHOTOSENSITIVE MONOLITHIC GLASS APPARATUS

(75) Inventors: Robert A. Lieberman, Torrance, CA (US); Edgar A. Mendoza, Redondo Beach, CA (US); David Mintzer, Santa Monica, CA (US)

(73) Assignee: Physical Optics Corporation, Torrance, CA (US)

( * ) Notice: Subject to any disclaimer, the term of this patent is extended or adjusted under 35 U.S.C. 154(b) by 5 days.

(21) Appl. No.: 09/627,983

(22) Filed: Jul. 28, 2000

Related U.S. Application Data (62) Division of application No. 08/902,415, filed on Jul. 29, 1997, now Pat. No. 6,446,467.

(51) Int. Cl.[7] .............................................. C03B 8/02
(52) U.S. Cl. ....................................... 65/17.2; 423/338
(58) Field of Search ......................... 65/17.2, 395, 440; 423/338

(56) References Cited

U.S. PATENT DOCUMENTS 5,609,992 A * 3/1997 Sorori et al. .............. 430/281.1

FOREIGN PATENT DOCUMENTS

| JP | 3-191358 | * | 8/1991 |
| JP | 7-273381 | * | 10/1995 |
| JP | 7-306306 | * | 11/1995 |
| JP | 8-23152 | * | 1/1996 |

OTHER PUBLICATIONS

Coudray et al, "Ultraviolet light imprinted sol–gel silica glass waveguide devices on silcon", Optics Communications, vol. 128 pp 19–22, Jul. 1996.*

Coudray et al, "Sol–gel channel waveguide on silicon: fast direct imprinting and low cost fabrication," Optics Communications, vol. 143, pp 199–202, Nov. 1997.*

Photolithography of Integrated Optic Devices in Sol–Gel Glasses Edgar A. Mendoza, Douglas J. Ferrell, Steven J. Syracuse, Albert N. Khalil, Robert A. Lieberman 580/SPIE vol. 2288 Sol–Gel Optics III (1994).

Anisotropic Etching of Silicon, D.B. Lee, Jour. of App. Physics, vol. 40, No. 11, Oct. 1969. pp. 4569–4574.

Anisotropic Etching of Silicon, Kenneth E. Bean, IEEE, vol. Ed–25, No. 10, Oct. 1978. pp. 1185–1193.

Glass Integrated Optics and Optical Fiber Devices, S. Iraj Najafi, Critical Reviews of Optical Science and Technology, vol. CR53, Jul., 1994, pp. ix–xi.

Sol–gel Process for Glass Integrated Optics, John D. Mackenzie and Yu–Hua Kao, Critical Reviews of Optical Science & Technology, vol. CR53, Jul., 1994, pp. 83–113.

Photosensitive Glass Integrated Optical Devices, BJ Ainslie, GD Maxwell & DL Williams, Critical Reviews of Optical Science & Technology, vol. CR53, Jul., 1994, pp. 235–249.

* cited by examiner

*Primary Examiner*—Sean Vincent
(74) *Attorney, Agent, or Firm*—Leonard Tachner; Lisa M. Gehrke (57) ABSTRACT

A partially modified photosensitive monolithic oxide glass apparatus formed through photolithographic imaging. The apparatus may be either a volume apparatus or a layer apparatus. Both types of apparatus may be used to diffuse light in predetermined directions or shapes. The monolithic oxide glass apparatus is capable of withstanding temperatures well beyond glass transition temperatures of plastic light shaping devices and can be formed in convex or concave surfaces through conventionally molding grinding or polishing techniques and can be coated by hot-coating techniques.

12 Claims, 11 Drawing Sheets

METHOD OF MAKING PHOTOSENSITIVE MONOLITHIC GLASS APPARATUS

The application is a division of U.S. Ser. No. 08/902,415, filed Jul. 29, 1997 now U.S. Pat. No. 6,446,467.

BACKGROUND OF THE INVENTION

1. Field of the Invention

The invention relates to holographic Light Shaping Diffusers® (LSDs)® and, more particularly relates to an LSD formed from a monolithic glass material and to a method of forming a monolithic glass LSD.

2. Background of the Invention

Holographic Light Shaping Diffusers® (LSDs)®, sometimes known as light shaping homogenizers or simply diffusers, are a type of diffuser used in a variety of illuminating, imaging, and light projecting applications. An LSD is a transparent or translucent structure having an entrance surface, an exit surface, and light shaping structures formed on its entrance surface and/or in its interior. These light shaping structures, sometimes collectively known as speckle (particularly when they are present within the volume of the structure as opposed to only on its surface), are random, disordered, and non-planar microsculpted structures that act as miniature lenses which produce non-discontinuous and smoothly varying changes in the refractive index of the LSD medium. They often are akin in appearance to sponges distributed randomly through the product. These light shaping structures refract light passing through the LSD so that the beam of light emitted from the LSD's exit surface exhibits a precisely controlled energy distribution along horizontal and vertical axes. LSDs can be used to shape a light beam so that over 90% (and up to 95%–98% of the light beam entering the LSD is directed towards and into contact with a target located downstream of the LSD. An LSD can be made to collect incoming light and either 1) distribute it over a circular area from a fraction of a degree to over 100° or 2) send it into an almost unlimited range of elliptical angles. For example, a 0.2°×50° LSD will produce a line when illuminated by an LED or laser and a 35°×90° LSD will form a narrow field, high resolution rear projection screen when illuminated by the same light source.

Rather than exploiting a property of monochromatic laser light known as coherence that requires that the finished holographic element be used only at the laser's wavelength, an LSD operates perfectly in white light. LSDs therefore exhibit a high degree of versatility because they may be employed with light from almost any source, including LEDs, daylight, a tungsten halogen lamp, or an arc lamp.

Two types of LSDs are currently available, namely a "volume LSD" and a "surface LSD". A surface LSD is a surface relief holographic element characterized by the incorporation of light shaping structures (or a computer generated approximation of them) on its surface. A volume LSD is a volumetric holographic element characterized by the incorporation of light shaping structures (or a computer generated approximation of them) within its body and possibly also on its surface. Volume LSDs and surface LSDs are interchangeable in most applications. There are some limited applications, however, in which only volume LSDs can be used, such as applications in which the LSD is submerged in a liquid.

Both volume and surface LSDs typically are produced using a "sub-master" that is itself an LSD which contains the holographic surface structures forming the light shaping structures. In the case of a volume LSD, the light shaping structures are recorded in the product structure using standard holographic recording techniques (one or two beam) or a process akin to a printing process. In the case of a surface LSD, the surface structures are embossed or formed in some other way directly onto the surface of the product structure. LSD production using a light shaping structure-bearing master or sub-master is disclosed in U.S. Pat. No. 5,365,354 to Jannson et al. (the '354 patent), U.S. Pat. No. 5,609,939 to Petersen et al. (the '939 patent), and U.S. Pat. No. 5,534,386 to Petersen et al. (the '386 patent). The '354 patent, the '386 patent, and the '939 patent hereby are incorporated by reference for their disclosure of the production of an LSD.

LSDs heretofore were formed solely from plastics such as acrylic or polycarbonate plastics because only these materials were sufficiently deformable (under conditions suitable for interaction with a sub-master) to accept the light shaping structures. Limitations resulting from the physical properties of these plastics restrict the applicable range of LSD operation.

For instance, the plastics from which LSDs are formed typically have a glass transition temperature of below about 150° C. and often below about 100° C. Conventional plastic LSDs therefore cannot be used in applications in which the LSD may be subjected to sufficient heat to raise the temperature of the LSD to above this glass transition temperature. This heat may be received directly from a light source such as an arc lamp or may be absorbed in the form of UV or infrared radiation. Plastic LSDs therefore generally cannot be used in heat lamps, liquid crystal display projectors, projector lamps, track lighting, or other light sources that generate significant heat near the location of the LSD. Plastic LSDs also are not widely usable with light sources operating in the ultraviolet range or infrared range which emit radiation that is absorbed by the plastic.

Conventional plastic LSDs also are not useable with many UV light sources for the additional reason that the plastic material is a poor transmitter of UV radiation. The typical plastic LSD transmits only about 75% of incoming light of a 365 nm wavelength. Transmission efficiency drops to below about 50% when the incoming light has a wavelength of 350 nm, rendering conventional plastic LSDs ill-suited for use with light sources of less than about 400 nm and effectively useless for light sources of less than about 350 nm. This is a serious limitation of conventional plastic LSDs because many widely-used light sources operate in the UV range, including a mercury laser (365 mn), a triple band laser (355 nm), and a number of excimer lasers (approximately 270 nm).

Another limitation of plastic LSDs is that they cannot be subject to a hot coating operation. It is often desirable to coat a diffuser with a layer of an anti-reflective (AR) coating in order to raise the efficiency of the diffuser. Many coatings, including many AR coatings, can be applied only at temperatures above the glass transition temperature of plastics commonly used in LSDs. Conventional LSDs are not usable with these coatings.

Yet another problem associated with a conventional plastic LSD is that it is difficult or impossible to form a high quality three-dimensional lens on its exit surface. It is desirable in a variety of diffuser applications to place a lens on the exit surface of the diffuser. Conventional plastic LSDs cannot be ground, polished, or molded into high quality lenses. High quality lenses can be produced on the exit surface of an LSD only by laminating or otherwise attaching a Fresnel lens on it. (As is well known in the art, a Fresnel lens is one having a planar or two-dimensional surface that in use creates an effect that is designed to approximate the effect of a three-dimensional curved lens.) Mounting a separate Fresnel lens onto the exit surface of a diffuser is substantially more difficult and expensive than simply grinding or otherwise forming a conventional curved lens on the exit surface and may produce a lower quality lens.

Many of the above-identified disadvantages of a plastic LSD could be avoided if the LSD were to be formed from glass rather than a plastic. However, light shaping structures cannot be embossed on or otherwise recorded in a conventional glass structure during its production process because the high temperatures accompanying formation of conventional glass (on the order of 1,800°) would destroy the master or sub-master bearing the light shaping structures.

OBJECTS AND SUMMARY OF THE INVENTION

It is therefore a principle object of the invention to provide an LSD that has a wider operating range in terms of temperature and/or wavelength than currently available plastic LSDs.

Another object of the invention is to provide an LSD capable of having a high quality curved lens formed on its exit surface.

Still another object of the invention is to provide a method of making a glass LSD from a monolithic glass material which, when formed, meets some or all of the foregoing objects.

These objects are achieved in a remarkably simple and effective manner by forming an LSD in a glass material which assumes a state during one or more phases of its formation process in which the desired light shaping structures can be embossed on or otherwise recorded in the glass material under conditions hospitable to the master or sub-master. Preferably, the light shaping structures are produced during formation of a so-called "sol-gel" glass either by an imaging technique such as a photolithographic imaging technique (thereby forming a volume LSD) or by an embossing technique (thereby forming a surface LSD).

In the case of castable sol-gel glasses, volume LSDs can be produced by (1) applying a photosensitizer to the sol-gel material during formation of the monolithic oxide glass, thereby rendering the monolithic oxide glass photosensitive, and (2) exposing selected portions of the photosensitive monolithic oxide glass to light through a photomask containing light shaping structures to form a metal oxide in the exposed portions of the mask which binds irreversibly with the monolithic oxide glass, thereby producing a volume LSD. The applying step may comprise mixing the photosensitizer in stoichiometric amounts with sol-gel precursors during preparation of the solution or depositing the photosensitizer onto the porous glass after the aging step.

Surface LSDs can be produced from castable sol-gel glasses simply by casting the solution in a plastic mold bearing the light shaping structures on an inner surface thereof so that the light shaping structures are embossed on the sol-gel material during the sol-to-gel transition process.

Both volume LSDs and surface LSDs also can be produced from coatable sol-gel glasses by coating a layer of the sol-gel solution onto a substrate to produce a film layer on the substrate, causing the film layer to undergo a sol-to-gel transition, recording light shaping structures in at least a portion of the film layer, and aging the gel to form a porous glass. The final step in the preferred process is to heat treat the glass to its sintering temperature to produce a nonporous glass. In the case of a volume LSD, a photosensitizer is added to the sol-gel solution and the recording step comprises (1) placing a mask over the film layer (the mask bearing the light shaping structures) and then (2) exposing the mask to light to form a metal oxide in exposed portions of the film layer which binds irreversibly to the glass in the film layer. A surface LSD can be formed by the same process if the thickness of the photosensitized layer is approximately the same as the depth of relief on the master used to produce a true surface relief LSD. In the case of a surface LSD, the recording step comprises pressing a plastic master bearing the light shaping structures into contact with the film layer.

These and other objects, features, and advantages of the invention will become apparent to those skilled in the art from the following detailed description and the accompanying drawings. It should be understood, however, that the detailed description and the specific examples, while indicating preferred embodiments of the present invention, are given by way of illustration and not of limitation. Many changes and modifications may be made within the scope of the present invention and without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

Pursuant to the invention, a method is provided of forming a holographic light shaping diffuser (LSD) from a monolithic glass material by recording light shaping structures in the glass material during its formation. A volume LSD may be produced by the photolithographic writing or other imaging of light shaping structures in a photosensitive glass material. Alternatively, a surface LSD may be produced by applying the process to a thin film of photosensitive glass coated onto a substrate, or by embossing light shaping structures onto a high quality optical glass or by embossing light shaping structures on a glass film layer coated onto a substrate. Both types of diffusers control the angular spread of transmitted light while homogenizing otherwise spatially noisy light sources such as LCDs and filamented light sources and while maintaining damage thresholds consistent with any glass optical element. The LSD has a transmission efficiency of over 90% from the Ultraviolet wavelengths through the physical spectrum and into the near-infrared. Moreover, because the LSD is a true glass, it is capable of withstanding temperatures well beyond glass transition temperatures of plastic LSDs, can be formed in a convex or concave surfaces through conventional molding, grinding, or polishing techniques, and can be coated by hot-coating techniques. The LSD also has a very high laser power threshold.

2. Process Overview

At the heart of the invention is the discovery that an LSD can be produced by recording light shaping structures (sometimes known collectively as "speckle", particularly when the structures extend into the interior of the diffuser) in a monolithic glass material during material formation if the glass material is one which is formed under conditions hospitable to the master or sub-master bearing the light shaping structures. The currently-preferred technique for carrying out the present invention involves recording the light shaping structures in the material during a so-called "sol-gel" process. As is known to those skilled in the art of making sol-gel glass, the sol-gel process is a low-temperature approach to the production of oxide glasses. An oxide network is obtained via hydrolization and inorganic polymerization reactions starting with molecular precursors. The sol-gel process offers several advantages when compared to the production of glasses by conventional melting techniques including 1) the formation of a higher optical quality metal oxide glass, 2) the ready obtainment of homogeneous multi-component glasses by mixing molecular precursor solutions, 3) the obtainment of higher purity and lower processing temperatures, and 4) the ability to form fibers, films, monoliths, or compositions by techniques such as fiber drawing, spinning, dipping, casting and impregnation due to the rheological properties of the sols or gels. Properties of sol-gel glasses rendering them well-suited for use as LSDs are summarized in Table 1:

TABLE 1

Material Properties of Sol-Gel Derived Silica Glasses

| | |
|---|---|
| Young Modulus | 73 GPa |
| Hardness | 6.2 GPa |
| Strength | 5.5 GPa |
| Thermal Expansion Coefficient | $5.5 \times 10^{-7}$ °C.$^{-1}$ |
| Thermal Conductivity | $3.3 \times 10^{-3}$ cal sec$^{-1}$° C.$^{-1}$ |
| Laser Damage Threshold | 1–5 Joules cm$^{-2}$ |
| Chemical Resistance | High (moisture acid and base) |

The typical sol-gel process includes first preparing a solution of a metal alkyl oxide, water, and a suitable solvent such as ethanol, then causing or permitting the solution to undergo a sol-to-gel transition to form a gel, then aging the gel to form a porous hydrated glass. The hydrated glass is then heat treated to reduce its porosity by consolidation. A common example of the process uses a mixture of tetra-ethylorthosilicate (TEOS), water, and ethanol to produce fused silica glass. Other examples include the use of aluminumtert-buitoxide [Al(OBu)$_3$] for alumina gels and tetraorthoethyltitanate (TET) for titania gels. Depending on the optical properties of the glass material desired, multi-component reagents are often mixed into the solution to produce glasses with special characteristics such as high indexes of refraction, high strength, high temperature, non-linear properties, and conduction properties.

Figure 1:
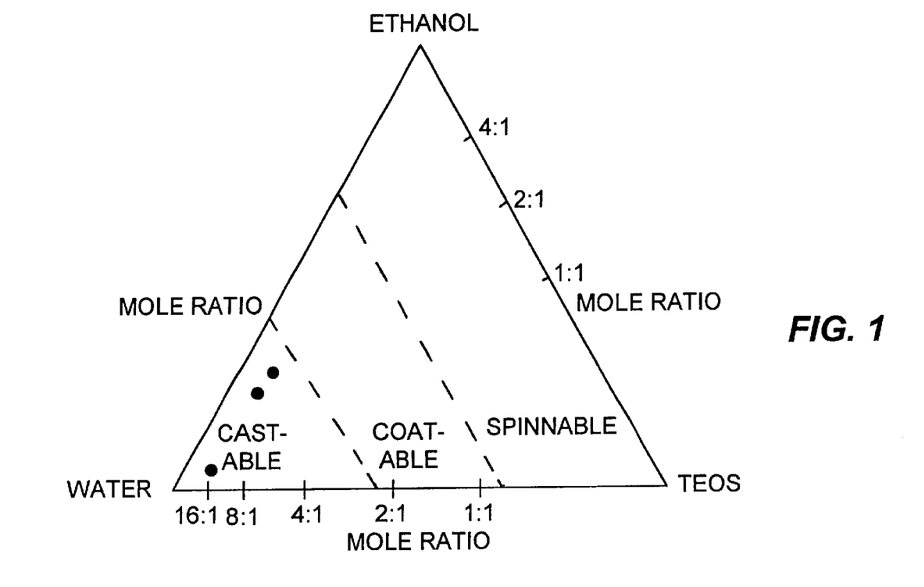
FIG. 1 is a ternary phase diagram for the TEOS-Water-ethanol sol-gel solution with compositions plotted in mole percent.

The chemistry of the sol-gel process is based on the hydroxylation and condensation reactions of organometallic molecular precursors. Metal alkoxides are the most versatile precursors for the sol-gel synthesis of oxides because they are very reactive towards nucleophilic reagents such as water. Hydrolysis occurs when a metal alkoxide and water are mixed in a mutual solvent, usually an alcohol. Sol-gel matrices for silica LSDs can be divided into spinnable, coatable, and castable solutions. Empirical miscibility formulations for TEOS-water-ethanol solutions at room temperature are plotted on the triangular phase diagram of FIG. 1 in mole percent. As can be seen from this Figure, sol-gel solutions are spinnable with less than 40 mole percent water, are coatable with between 40 and 70 mole percent water, and are castable with more than 70 mole percent water.

Figure 2:
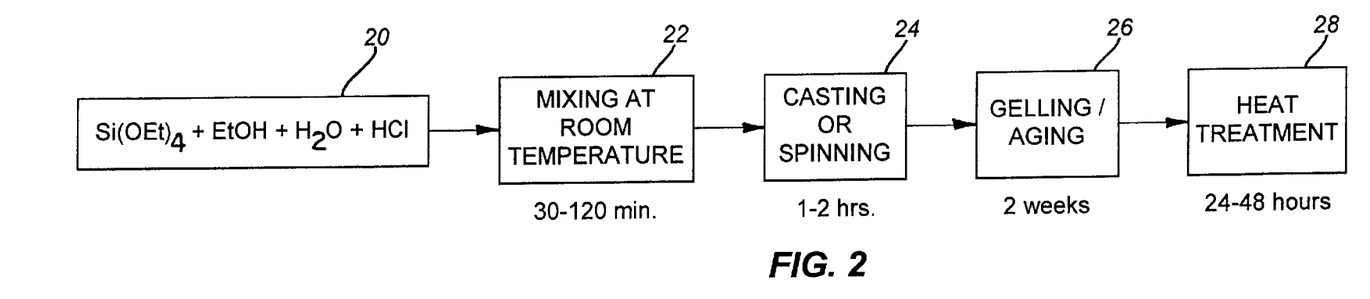
FIG. 2 is a flow chart schematically representing a process for preparing a sol-gel monolithic glass from a TEOS precursor solution.

A typical sol-gel process will now be described to facilitate an understanding of how light shaping structures (speckle) can be recorded in a monolithic glass structure at low temperatures hospitable to the master or sub-master. Referring now to FIG. 2, a process for producing a high optical quality monolithic silica glass by casting begins by preparing a solution of TEOS in ethanol and then partially hydrolyzing the solution with water as seen in Step 20. The solution subject to mixing typically will contain about 45% by volume TEOS, 45% by volume ethanol, and 10% by volume water which if desired may include approximately 1% by volume of a suitable acid such as HCl to lower the pH of the finished glass product so as to increase its durability. The ratios of TEOS, ethanol, and water could be varied so long as the relative ratios of all three of these components are retained in the portion of the triangular construction of FIG. 2 that results in a castable solution.

The solution is then mixed in Step 22 to increase its viscosity by the hydrolyzatuib of TEOS and the evaporation of ethanol. This mixing preferably takes place at room temperature and usually continues for 30–120 minutes with a 60 minute mixing period being the preferred minimum period to obtain a preferred viscosity of approximately 100 Cts. The process can be accelerated by mixing at higher temperatures (up to about 70° C.) to increase the rate of ethanol evaporation or decelerated by mixing at lower temperatures (down to about 0° C.) to decrease the rate of ethanol evaporation.

Next, the viscous solution formed by the mixing step is cast in a suitable casting mold in Step 24. The cast solution then undergoes a gelling/aging process in Step 26 characterized by transition of the viscous solution to a gelatinous phase followed by transition of the gel to a porous glass phase. For monoliths, this process typically takes about 2 to 4 weeks (and sometimes longer) depending upon the initial viscosity of the solution, the volume of solution in the casting mold, and the environmental conditions under which the process occurs. High quality glass can be obtained most assuredly by aging under conditions of controlled temperature and humidity. The aging process terminates with a baking operation in which the glass is heated in the mold at a relatively low temperature (preferably on the order of about 70° C. to 120° C.) for a sufficient period of time to harden the glass sufficiently to permit its removal from the mold and subsequent handling. The length of the baking period varies from application to application, ranging from as little as a few hours to as long as two days.

A true monolithic glass material is formed during the aging process. However, this glass is very porous and relatively brittle. The glass preferably is heat treated in Step 28 to consolidate the glass (i.e., to collapse the pores into a solid glass structure) by sintering and thereby to increase its rigidity and durability. The typical heat treatment process lasts about 24–48 hours in a cycle in which the temperature ramps upward from about 25° C. to about 1000° C. to about 1050° C. at a rate of 0.1° C. per minute (with the temperature being held at plateaus for periods of about 2 hours at increments of about 100° C.), and then ramps back down again.

Figure 3:
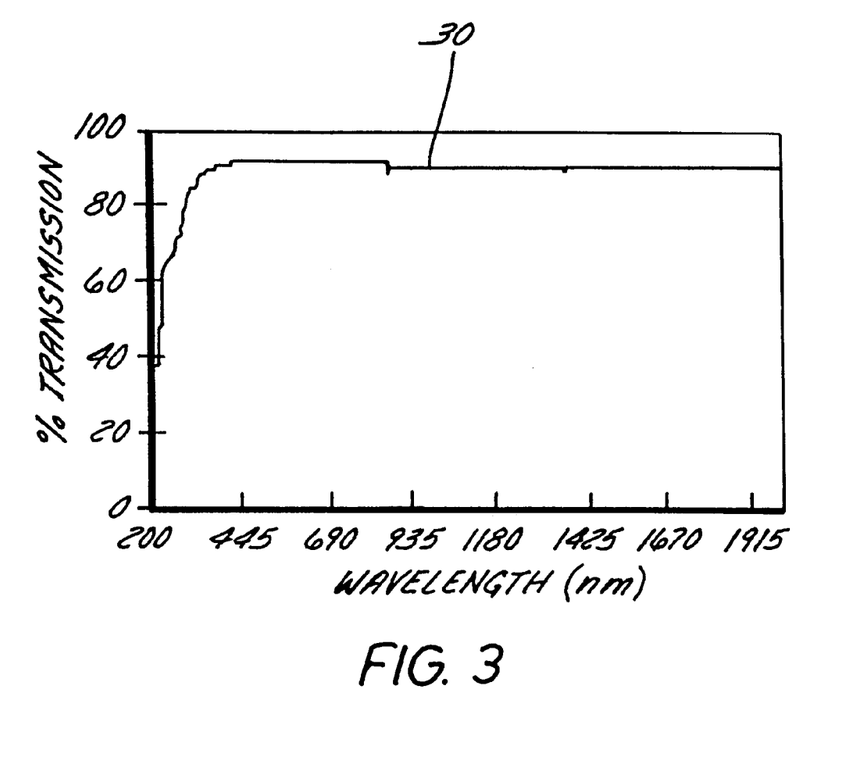
FIG. 3 is a graph plotting wavelength versus transmission percentage for a sol-gel monolithic glass with which the present invention is applicable.

The result of the process of FIG. 2 is a high quality silica glass monolith with high durability and other beneficial qualities discussed above in conjunction with Table 1. The resulting glass also has excellent transmissibility. In fact, as represented by the curve 30 in FIG. 3, the transmissibility of the monolithic glass exceeds 90% for wavelengths above about 350 nm and exceeds 95% or higher for wavelengths above about 450 nm.

It should be noted at this point that the casting process described above could be replaced with coating or spinning processes so long as the proper ratio of TEOS/ethanol/water is chosen. The gel-to-glass transition time for films typically is much shorter for films than for monoliths, typically lasting a few hours.

Light shaping structures can be recorded in a sol-gel glass material during an intermediate phase of its formation process to produce an LSD in the completed glass structure. Three preferred techniques for forming LSDs from monolithic sol-gel glass materials now will be detailed. While all of these techniques will be described in conjunction with a TEOS:ethanol:H$_2$O system, the described processes are equally applicable to any suitable metal alkoxide:alcohol:H$_2$O system.

3. Casting of Surface Relief LSDs Onto Sol-Gel Glasses

A surface relief LSD element or surface LSD can be produced by direct casting using the process described above in conjunction with FIG. 2. A surface structure bearing light shaping structures is placed directly on the inside surface of the casting mold, preferably by using a conventional plastic sub-master LSD as one or more of the inner surfaces of the casting mold. When a viscous solution is cast into the mold and aged during the Steps 24 and 26 discussed above in conjunction with FIG. 2, an exact replica of the light shaping structures on the surface of the plastic LSD sub-master is transferred directly to the surface of the gel in the mold. The resulting embossed light shaping structures are retained in the glass monolith structure.

Figure 8:
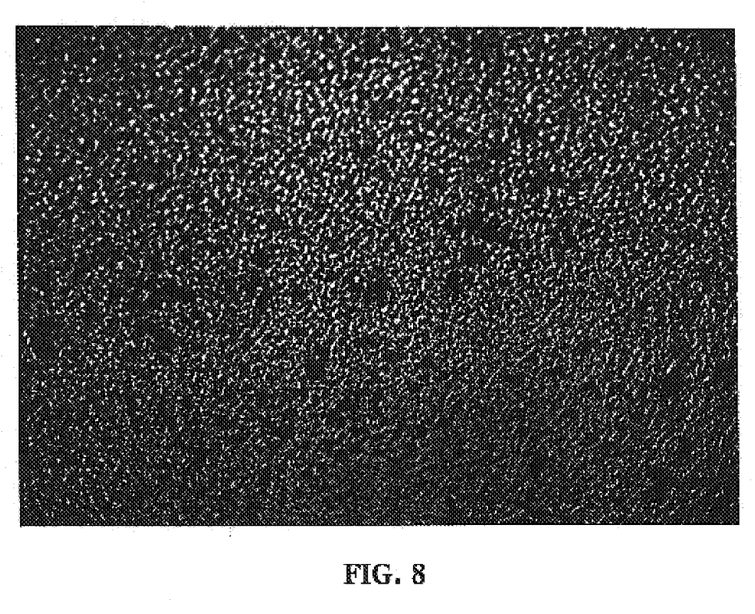
FIG. 8 is a photolithographic image of the surface structure of a cast sol-gel monolithic glass LSD produced in accordance with the present invention.
Figure 9:
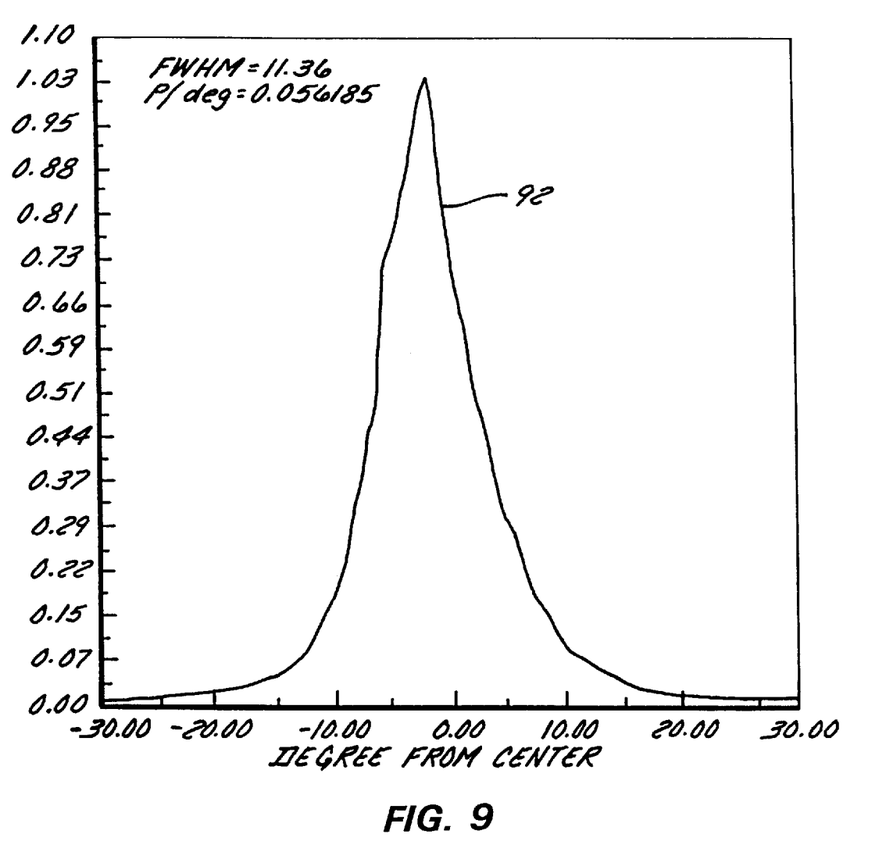
FIG. 9 is a graph plotting the light diffusing angular distribution of a cast sol-gel monolithic glass LSD.

The surface LSD produced by this process has a surface roughness illustrated in the photolithograph of FIG. 8 with modulations ranging from 1 μm to 100 μm and with a detail structure of 10–50 μm in the lateral dimension. LSDs produced in this manner have diffusing angles of approximately 10° to 15° as can be seen by the curve 92 in FIG. 9. Depending upon the application, cast LSDs can be produced with a range of diffusing angles of approximately 0.1° to 60°. Because the LSD is formed in a true glass, it is capable of withstanding temperatures of above 1000° C.—dramatically higher than the 100–150° C. glass transition temperature of conventional plastic LSDs. Its exit surface also can be formed (by molding), ground, and/or polished to produce a three-dimensional lens. AR and other coatings also can be applied by conventional hot coating techniques without harming the glass. Moreover, as discussed above in conjunction with FIG. 3, the glass LSD exhibits dramatically improved transmissibility at low wavelengths then than does a conventional plastic LSD.

Figure 4:
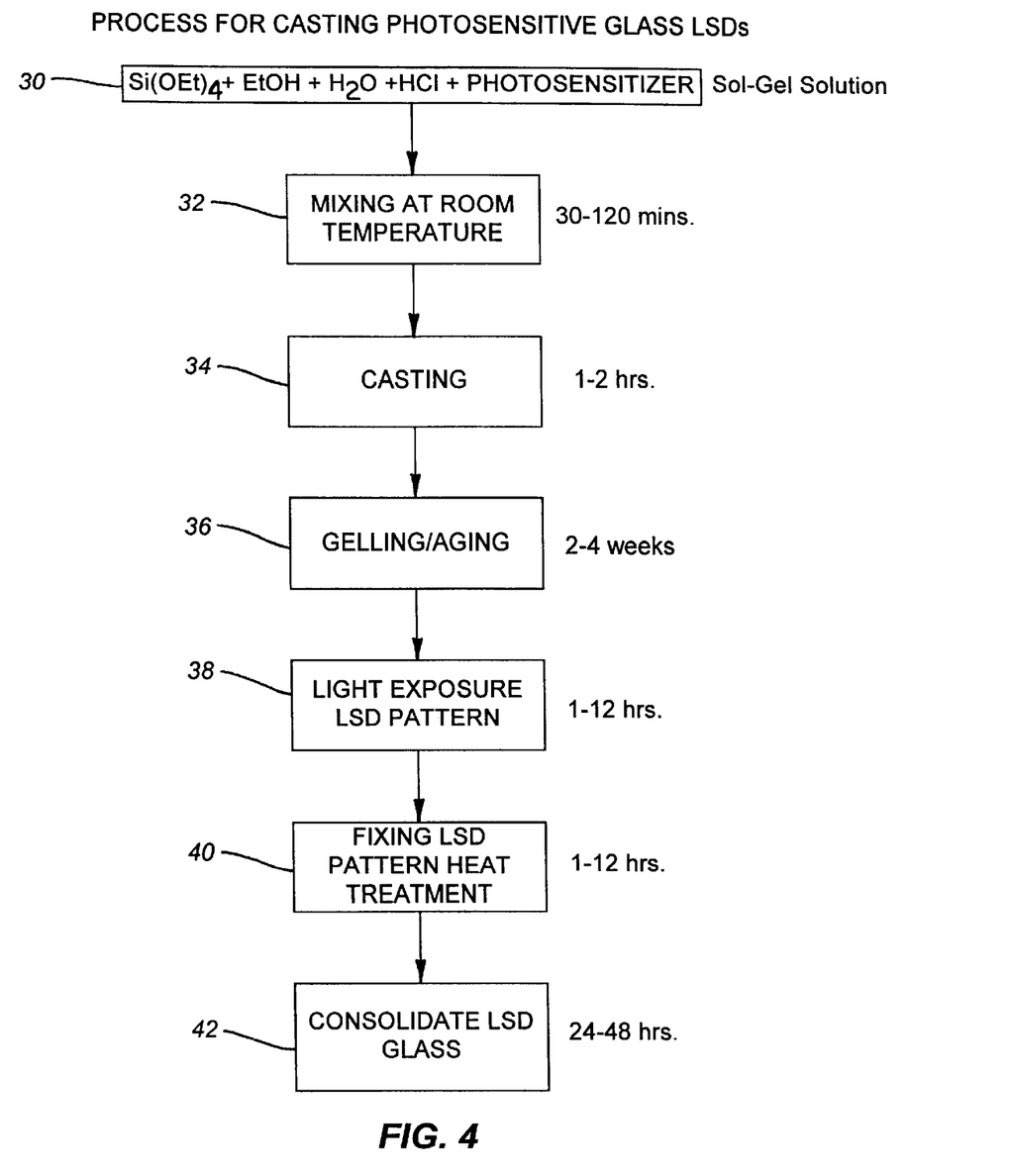
FIG. 4 is a flow chart schematically representing a first process for forming a photosensitive monolithic glass LSD by casting.

4. Photolithographic Fabrication of Volume LSDs on Photosensitive Sol-Gel Glasses Direct casting produces a surface LSD. However, as discussed above, volume LSDs and surface LSDs are interchangeable for most applications and a few applications require the use of a volume LSD. One technique for producing a volume LSD from a cast sol-gel monolithic glass is by photolithographic fabrication. Referring now to FIG. 4, a preferred process for producing an LSD in this manner begins with the preparation of a sol-gel solution in Step 30, just as the basic sol-gel glass formation process described in Section 2 above begins with the preparation of a sol-gel solution. However, a photosensitizer is mixed in stoichiometric amounts with the basic sol-gel precursor solution in a proportion of about 1% to 3% by weight and typically in a proportion of about 2% by weight. This photosensitizer has the formula:

$$R\text{-}M\text{-}X$$

where

R is a low molecular organic compound such as ethyl, propyl, or methyl;

M is any transition metal as well as any metal selected from any of Groups IV, V, and VI; and X is a photolabile, preferably a halogen or a carbonyl.

R-M-X compounds suitable for formation of LSDs by photolithographic contact imaging (or, alternatively, by holographic imaging) include trimethyltiniodide, titanocene, and ironpentacarbonyl. The compound chosen will depend upon the light source that is to be used during the exposure step (see the description of Step 38 below). Trimethyltiniodide requires 5–10 hours of exposure to a light source having a wavelength of 250 nm. Titanocene requires 30 minutes to 2 hours of exposure to a light source having a wavelength of 514 nm. Ironpentacarbonyl requires only 2–5 minutes of exposure to a light source having a wavelength of 365 nm.

The process then proceeds through the mixing, casting, and gelling/aging steps (Steps 32, 34, and 36, respectively) as described above in connection with FIG. 2. The aging process terminates with a step of heating the glass within the mold sufficiently for handling required for a photolithographic imaging process or for imaging using a standard holographic one or multiple beam recording process. Sufficient porosity reduction and resultant improvement in handleability is obtained by heating the glass to a temperature of 70–100° C. for 5–6 hours.

Next, the light shaping structures are recorded in the photosensitive material in Step 38, preferably either through direct writing by photolithographic imaging or through holographic imaging. In the case of photolithographic imaging, a mask in the form of a LSD sub-master bearing the light shaping structures is placed on the surface of the glass, and the glass then is exposed to light. The light source used for this exposure may for example be an argon ion laser, a He-Cd laser, a Nd:YAG laser, an arc lamp, or other source. Exposure to light induces a photochemical reaction in the exposed portions of the glass not covered by the mask. The extent of this photochemical reaction is indicated by the disappearance of the characteristic adsorption peak of the photosensitizer. The end product of this reaction is a metal oxide ($MO_2$) produced by photogeneration. The metal oxide is bound irreversibly to the glass and induces a change in the glass's index of refraction. Depending on the concentration of the impregnated organometallic photosensitizer, the index of refraction of the sol-gel glass can be modified within the range of 1.4 to 2.5.

Next, the mask is removed from the glass and the glass is post-processed in Step 40 by being heated to approximately 700° C. Post-processing in this manner positionally fixes the photo induced light shaping structures in the glass and removes the unexposed photosensitive material by volatilization. The post-processed glass is heated to its consolidation temperature (typically about 1000° C. to 1050° C.) in Step 42 to consolidate the glass by sintering.

The result of the process is a volume LSD formed from silica glass doped with approximately 2% of a metal oxide such as titanium. The volume LSD image is of high quality and is produced in a fully dense glass optical material. As discussed above, because the LSD material is a true glass, the environmental and thermal stability of this glass material is far superior to that of conventional plastic recording materials.

Figure 10:
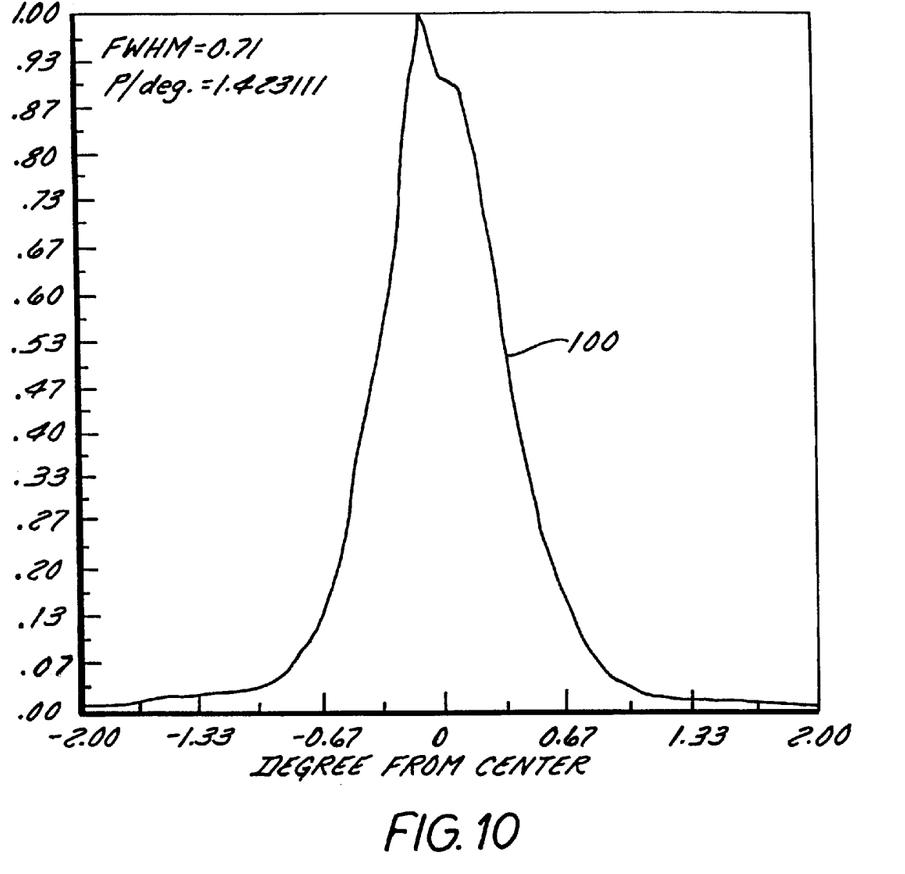
FIG. 10 is a graph plotting angular light spatial distribution of a narrow angle sol-gel monolithic glass LSD in which the glass is a porous glass.
Figure 11:
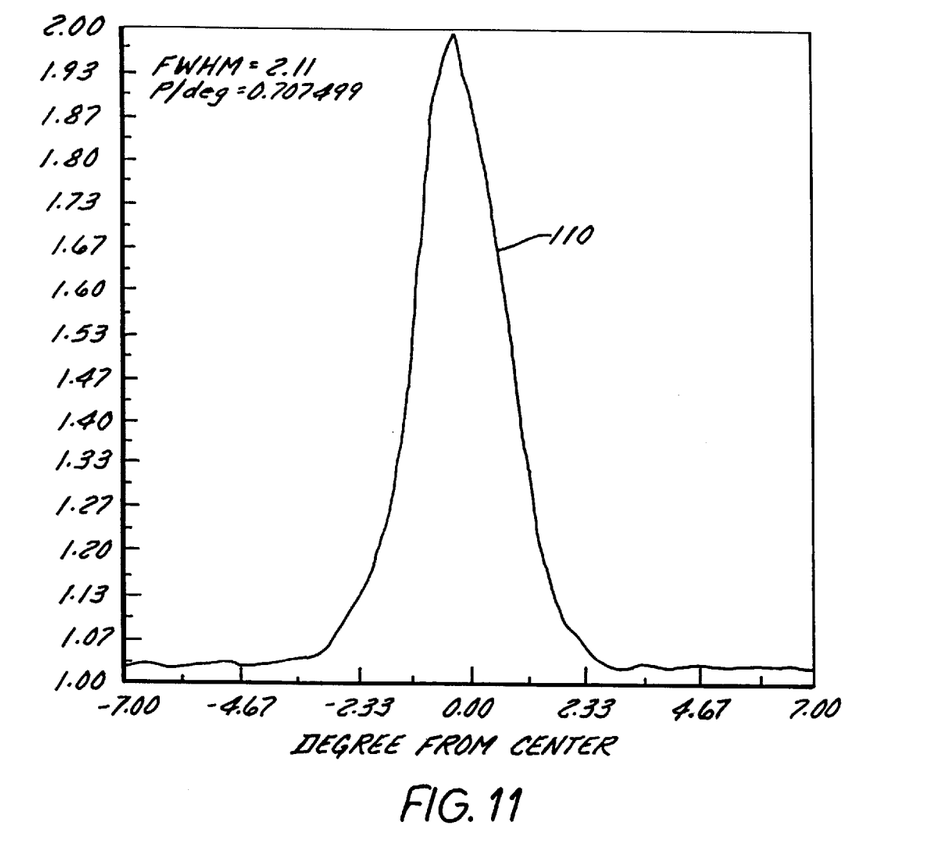
FIG. 11 is a graph plotting angular light spatial distribution of narrow angle sol-gel monolithic glass LSD in which the glass is a sintered glass.

Significant shrinkage (on the order of 30–40%) occurs during heat treatment. The effect of this shrinkage on angular spatial distribution can be appreciated from comparing the curve 100 in FIG. 10 to the curve 110 in FIG. 11. Curve 100 indicates that a narrow angle (0.71°) is obtained after post-processing to a temperature of about 700° C. (a temperature still well-below the consolidation temperature). Curve 110 illustrates that this angular light distribution increases to 2.11° after the consolidation process, i.e., after the pore structure is sintered at a temperature of about 1000° C. to 1050° C. This represents an overall increase in the angular distribution characteristic of approximately 66%.

It has been discovered that shrinkage due to heat-treating improves the optical qualities of an LSD. All components of the LSD, including the light shaping structures or speckle, shrink a corresponding amount. Speckle shrinkage results in enhanced imaging. For instance, if a line formed during the photolithographic imaging process is 100 microns wide, the corresponding line in the final produce will be 70 microns wide. (It should be noted that shrinkage due to heat treatment and the resultant image enhancement also occurs in surface LSDs produced by casting as described in Section 3 above as well as in surface or volume LSDs produced by coating as described in Section 5 below.)

Figure 12:
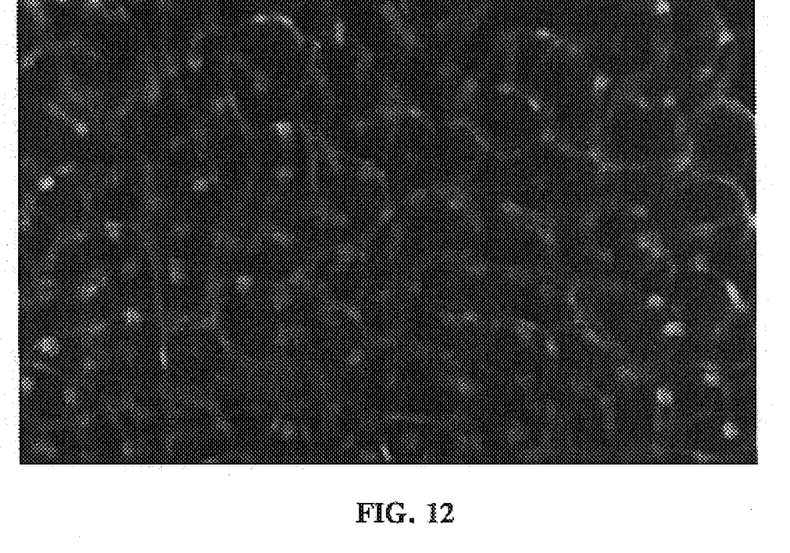
FIG. 12 is a photolithographic image of a holographic LSD structure formed on a sol-gel glass monolith in accordance with the present invention.
Figure 13:
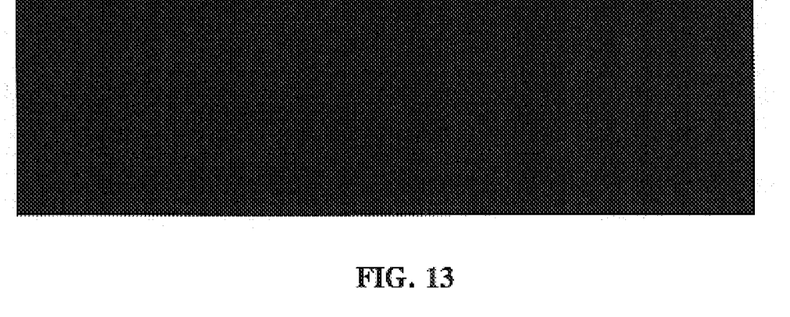
FIG. 13 is a photolithographic image of a far-field diffraction pattern of the LSD structure of FIG. 12.

FIG. 12 is a photolithographic image of a volume LSD structure formed by the process of FIG. 4 in which a conventional LSD sub-master is used as a contact mask for transferring the image onto the photosensitive glass followed by light exposure with a UV arc lamp. FIG. 13 illustrates the far-field illumination pattern of this same structure using a laser diode as an illuminating source. The structural features of this image range from 10–50 µm in a total random configuration.

Figure 5:
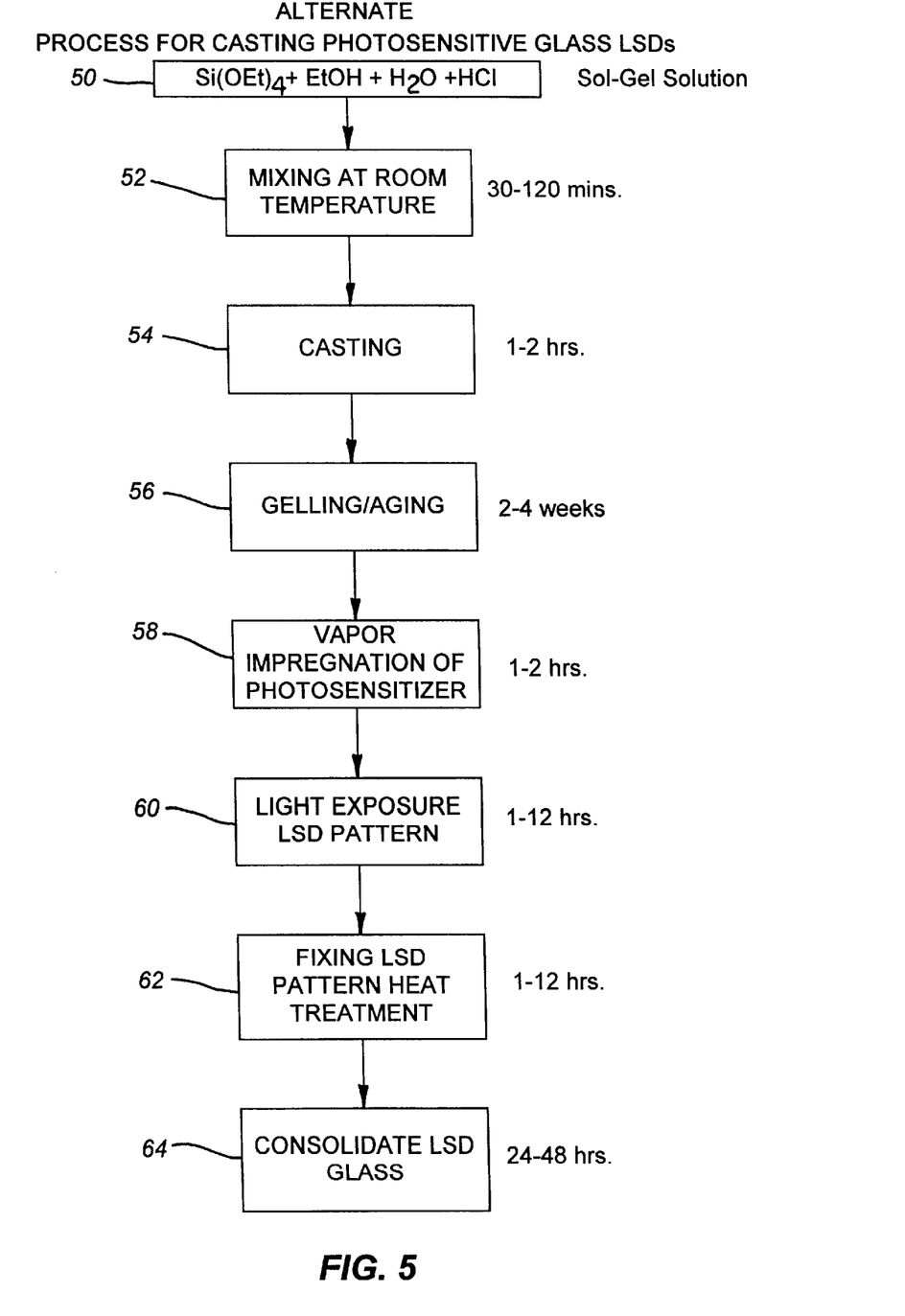
FIG. 5 is a flow chart schematically representing a second process for forming a photosensitive monolithic glass LSD by casting.

A variation of the procedure discussed above in connection with FIG. 4 is to apply the photosensitizer to the porous glass rather than to the solution. Referring to FIG. 5, a process for the formation of a volume LSD by this technique is illustrated schematically, beginning with Steps 50, 52, 54, and 56 which are in all respects identical to the corresponding Steps 30, 32, 34, and 36 of the basic sol-gel process discussed in Section 2 above. A conventional porous sol-gel monolithic glass therefore is formed at the end of the gelling/aging process. Then, in Step 58, a suitable organometallic photosensitizer is impregnated into the surface of the porous glass, e.g., by vapor deposition or solution impregnation for a period of about 1–2 hours. A sub-master mask bearing the desired light shaping structures then is placed on the impregnated surface and exposed to light in Step 60, thereby producing an $MO_2$ distribution within the exposed portions of the monolithic sol-gel glass structure. This distribution induces a change in the index of refraction of the glass as discussed above in conjunction with FIG. 4. The glass then is post-processed in Step 62 to positionally fix the light shaping structures in the glass in the manner discussed above and then heat treated in Step 64 in the conventional manner.

The speckle distribution of LSDs formed by the process of FIG. 5 is somewhat different than the speckle distribution of LSDs formed by the process of FIG. 4. LSDs formed by placing the photosensitizer in solution exhibit a uniform speckle distribution throughout the depth of the glass. LSDs formed by depositing the photosensitizer onto the surface of the porous glass exhibits a speckle density gradient that decreases with increased distance from the entrance surface of the glass due to increased photosensitivity at the entrance surface of the glass resulting from a greater photosensitizing agent concentration at the entrance surface. The resulting volume LSD exhibits a gradient in its refractive index profile. This gradient refractive index may be useful in some lens applications.

5. Fabrication of LSDs From Coatable or Spinnable Sol-Gel Glasses

Figure 6:
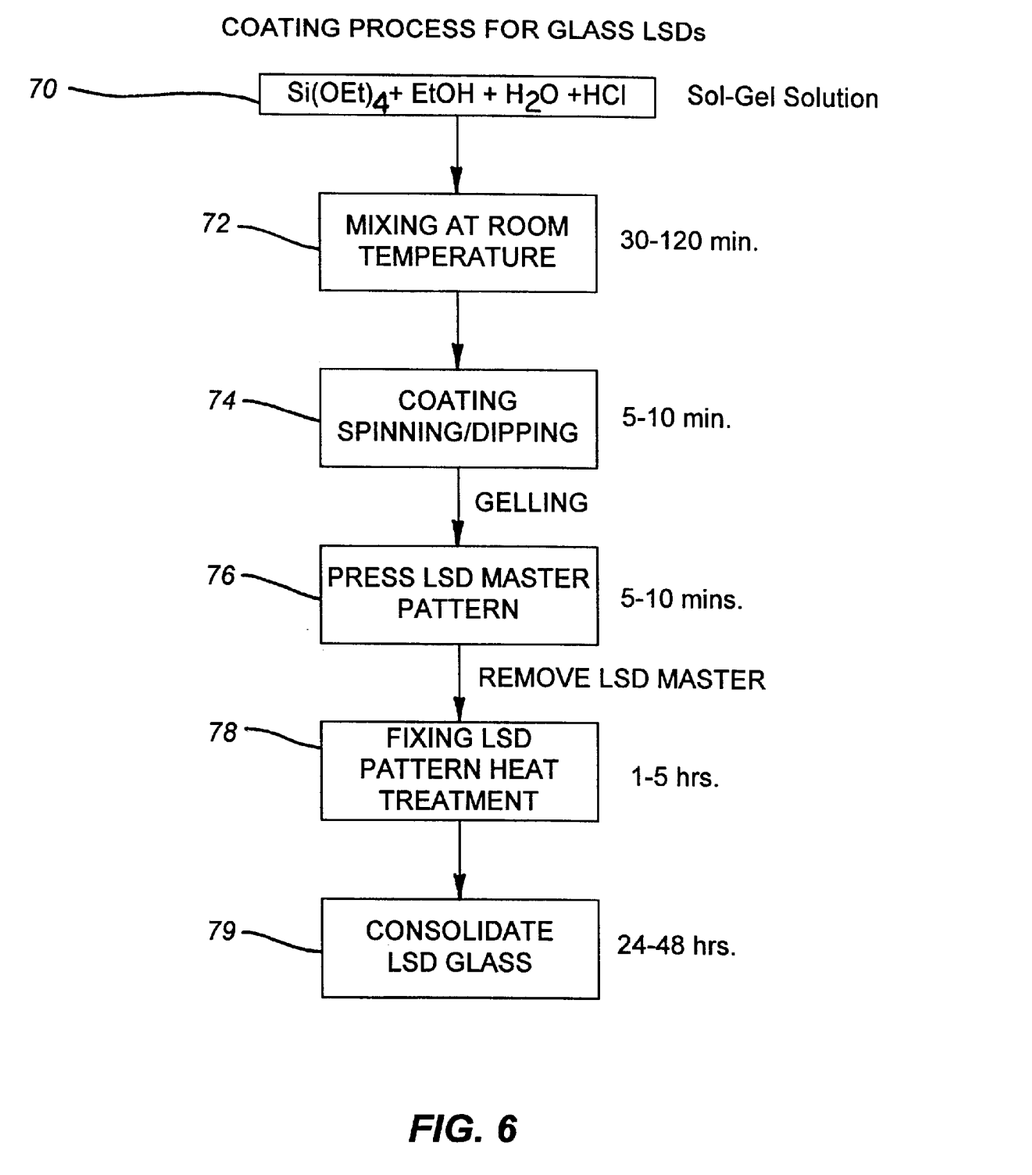
FIG. 6 is a flow chart schematically representing a first process for forming a monolithic glass LSD by coating.

It is also possible and often desirable to produce LSDs from coatable or spinnable sol-gel glasses. When compared to castable sol-gel glasses, coatable sol-gel glasses are generally considered to be better-suited for mass production because the gelling/aging period is much shorter than the gelling/aging period of castable sol-gel glasses (on the order of a few hours as opposed to two weeks or more for a castable glass). Referring to FIG. 6, an exemplary coating process proceeds from solution preparation in Step 70 (which is identical to the preparation Step 20 described above) to mixing in Step 72. Less mixing is required than discussed in Sections 2–4 above in conjunction with the casting processes because a lower viscosity (on the order of about 10–20 Cts) is required for coating. The somewhat-viscous solution is then coated onto a conventional glass substrate in Step 74 by a known spinning, dipping, or spin-coating technique thereby to deposit a thin film layer having a thickness of about 10 microns to 100 microns on the surface of the substrate. Then, while the film layer is gelling, a plastic LSD master or sub-master bearing the light shaping structures is pressed against the surface in Step 76 to emboss a direct replica of the light shaping structures on the film layer. The light shaping structures are then fixed in place in Step 78 by heating the film layer to about 50° C. for 1–2 hours so that the glass of the film layer transitions from a gelatinous phase to a porous glass phase (this is analogous to the aging step in the casting process). The LSD master then is removed from the glass, and the glass is heat treated in the normal manner in Step 79 to consolidate the glass in the film layer. A variation to this approach could be to consolidate the pressing and heating Steps 74 and 76 by using a heated press to apply the LSD structures to the film layer.

Figure 7:
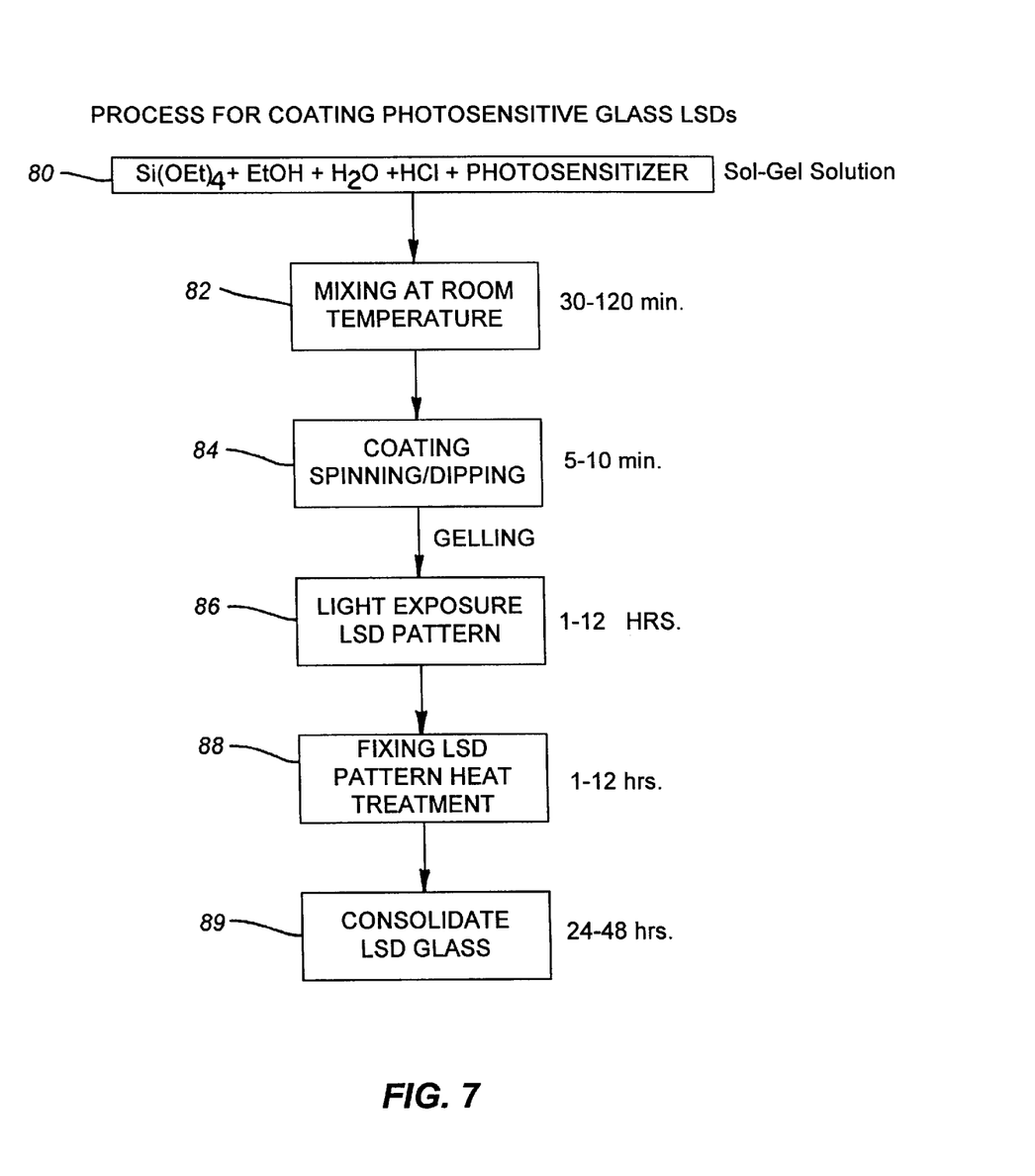
FIG. 7 is a flow chart schematically representing a second process for forming a photosensitive monolithic glass LSD by coating.

The process described above in conjunction with FIG. 6 produces a surface diffuser. It is also possible to produce a volume diffuser in a coatable or spinnable sol-gel glass, e.g., through a photolithographic imaging technique such as that illustrated schematically in FIG. 7. The preparing, mixing, and coating steps (Steps 80, 82, and 84) are identical to corresponding steps (Steps 70, 72, and 74) of the process of FIG. 6 except that an organometallic photosensitizer is added to the solution prior to or during the mixing step. The result of Step 84 is the production of a substrate having a thin layer of a photosensitive sol-gel film coated thereon. A mask in the form of a LSD sub-master then is applied to the film-bearing surface and subjected to light exposure in Step 86 as described in Section 3 above. The mask is then removed, and the glass is post-processed by heating in Step 88 to fix the light shaping structures in position. Finally, the LSD is consolidated by heat treating in Step 89 as in the previous embodiments.

An LSD with all of the properties of a surface LSD may also be produced by an identical photolighographic process if the photosensitized layer has a thickness on the order of the depth of the light shaping structures on the surface of the molds used for forming cast LSDs.

Monolithic glass LSDs produced by any of the techniques described above are highly versatile, high quality LSDs that can be used in high temperature applications in which conventional plastic LSDs would fail. Glass LSDs, unlike plastic LSDs, therefore can be used as homogenizers in lasers and particularly high power lasers, UV lasers, infrared lasers, and near-infrared lasers. They also can be used in optical applications where substantial heat is generated such as projectors and headlamps for automobiles. They may also replace a rod integrator used in movie projectors or the like and, indeed, are dramatically more efficient than conventional rod integrators (on the order of 90–96% efficient as opposed to on the order of 20% efficient). In addition, because they are formed from optical quality glass, their exit surfaces can be ground, polished, or otherwise formed into a high-quality curved lens—an option that is not available with plastic LSDs, or into any optical element such as a prism or a beam shaper.

Many changes and modifications may be made to the invention without departing from the spirit thereof. The scope of some of these changes are discussed above. The scope of the remaining changes will become apparent from the appended claims.

We claim:

1. A method of making an apparatus comprising:
   (A) preparing a sol-gel solution of a metal oxide, water, solvent and photosensitizer, wherein the photosensitizer is integrated into the sol-gel solution;
   (B) causing the solution to undergo a sol-to-gel transition;
   (C) placing a mask over gel formed through the sol-to-gel transition the mask bearing predetermined shapes;
   (D) exposing portions of the gel to light to form metal oxide in exposed portions of the film layer which binds irreversibly to the glass in the gel formed through the sol-to-gel transition;
   (E) then aging the gel to form a porous glass; and
   (F) heat treating the porous glass with a process wherein, the porous glass is heated at temperatures ranging between approximately 25.degree. C. and approximately 1050.degree. C. for approximately 24–48 hours in a cycle wherein the treating temperature first ramps upward from approximately 25.degree. C. to approximately 1050.degree. C. and then downward from approximately 1050.degree. C. to approximately 25.degree. C. at temperatures in increments of about 100.degree. C. at a rate on 0.1.degree. C. per minute, and wherein each temperature increment is held at a plateau for periods of approximately 2 hours to form non-porous, consolidated glass.

2. A method of making an apparatus comprising:
   (A) preparing a solution of sol-gel material from a metal alkoxide, water, and a solvent;
   (B) forming the sol-gel material through the steps including;
       (1) casting the solution into a casting mold;
       (2) causing the solution in the mold to undergo a sol-to-gel transition to form a gel;
       (3) applying a photosensitizer to the sol-gel material;
   (C) recording predetermined shapes on at least one surface of the sol-gel material through the process of exposing selected portions of the photosensitized sol-gel material to light to form a metal oxide in the exposed portions of the sol-gel material which bind irreversibly with the sol-gel material;
   (D) then aging the gel to form a porous glass; and
   (E) heat treating the porous glass with a process wherein, the porous glass is heated at temperatures ranging between approximately 25.degree. C. and approximately 1050.degree. C. for approximately 24–48 hours in a cycle wherein the treating temperature first ramps upward from approximately 25.degree. C. to approximately 1050.degree. C. and then downward from approximately 1050.degree. C. to approximately 25.degree. C. at temperatures in increments of about 100.degree. C. at a rate on 0.1.degree.C. per minute, and wherein each temperature increment is held at a plateau for periods of approximately 2 hours to form non-porous, consolidated glass.

3. A method as defined in claim 2, wherein the applying step comprises mixing the photosensitizer in stoichiometric amounts with a sol-gel precursor during preparation of the solution.

4. A method as defined in claim 2, wherein the applying step comprises depositing the photosensitizer onto the porous glass after the aging step.

5. A method of forming an apparatus comprising:
   (A) forming a photosensitive material, said material comprising a photosensitizer and sol-gel;
   (B) exposing said material through a mask to a light of a wavelength for a time sufficient to modify the exposed portion of the material through the formation of metal oxide;
   (C) then heating said modified material at a first temperature for a time sufficient to bind said metal oxide to said material and to drive off remaining photosensitizer to form a porous glass;
   (D) heat treating the porous glass with a process wherein, the porous glass is heated at temperatures ranging between approximately 25.degree. C. and approximately 1050.degree. C. for approximately 24–48 hours in a cycle wherein the treating temperature first ramps upward from approximately 25.degree. C. to approximately 1050.degree. C. and then downward from approximately 1050.degree. C. to approximately 25.degree. C. at temperatures in increments of about 100.degree. C. at a rate on 0.1.degree. C. per minute, and wherein each temperature increment is held at a plateau for periods of approximately 2 hours to form non-porous, consolidated glass.

6. The method of claim 5 wherein, forming step further comprises depositing photosensitizer onto the sol-gel after the sol-gel material is aged.

7. The method of claim 5 wherein the photosensitizer is trimethyltiniodine.

8. The method of claim 7 wherein the light has a wavelength of 250 nm.

9. The method of claim 5 wherein the photosensitizer is titanocene.

10. The method of claim 9 wherein the light has a wavelength of 514 nm.

11. The method of claim 5 wherein the photosensitizer is ironpentacarbonyl.

12. The method of claim 11 wherein the light has a wavelength of 365 nm.

* * * * *